United States Patent [19]

Leach

[11] Patent Number: 5,338,578
[45] Date of Patent: Aug. 16, 1994

[54] METHOD FOR ACHIEVING A SMOOTH POWDER COATED FINISH ON A LOW DENSITY COMPRESSION-MOLDED PLASTIC ARTICLE

[75] Inventor: Burr L. Leach, Marion, Ind.

[73] Assignee: GenCorp Inc., Fairlawn, Ohio

[21] Appl. No.: 6,564

[22] Filed: Jan. 21, 1993

[51] Int. Cl.$^5$ .............................................. B05D 1/06
[52] U.S. Cl. .................................. 427/470; 427/195; 427/378; 427/485; 427/521
[58] Field of Search ............... 427/195, 202, 470, 485, 427/378, 521; 264/129

[56] References Cited

U.S. PATENT DOCUMENTS

| | | | |
|---|---|---|---|
| 3,184,527 | 5/1965 | Fischer | 264/255 |
| 4,681,712 | 7/1987 | Sakakibara et al. | 264/131 |
| 4,727,111 | 2/1988 | Pettit, Jr. et al. | 525/190 |
| 4,737,403 | 4/1988 | Simpson et al. | 427/389.8 |
| 5,000,985 | 3/1991 | Salisbury | 427/203 |
| 5,021,297 | 6/1991 | Rhue et al. | |
| 5,066,693 | 11/1991 | Gupta | 523/466 |
| 5,190,790 | 3/1993 | Blankemeyer | 427/466 |
| 5,216,090 | 6/1993 | Merritt et al. | 525/437 |

FOREIGN PATENT DOCUMENTS

| | | |
|---|---|---|
| 0299420 | 7/1988 | European Pat. Off. |
| 1-234434 | 9/1989 | Japan |
| 2042930 | 10/1980 | United Kingdom |

OTHER PUBLICATIONS

Kirk–Othmer, Encyclopedia of Chemical Technology, 3rd ed., vol. 18 (John Wiley & Sons 1982) pp. 201-202.
Modern Plastics Encyclopedia, vol. 66, No. 11 (McGraw Hill 1989) p. 215.

*Primary Examiner*—Terry J. Owens

[57] ABSTRACT

A method for achieving a high gloss finish on a compression molded substrate, molded with or without vacuum, in which the substrate includes a hollow filler material and has a specific gravity of not more than 1.4, including the steps of heating at least the surface of the substrate, to a temperature above the melting temperature of a subsequently applied coating powder and applying a first layer of powder to the heated surface, and if necessary, elevating the temperature of the surface and maintaining the temperature of the heated surface above the curing temperature of powder by infrared radiation or by forced heated air for a time period sufficient to cure the powder and then, if desired, subsequently electrostatically applying a second coating to at least a portion of the first film.

13 Claims, No Drawings

METHOD FOR ACHIEVING A SMOOTH POWDER COATED FINISH ON A LOW DENSITY COMPRESSION-MOLDED PLASTIC ARTICLE

FIELD OF THE INVENTION

The invention relates generally to a method for the utilization of low density sheet molding compositions and in particular to sheet molding compositions ("SMC") having a high gloss finish, and more particularly to a method in which the SMC includes a filler material in the form of hollow spheres.

BACKGROUND OF THE INVENTION

Numerous applications currently exist for reinforced plastic resins, such as automobiles, off-the road vehicles, and boats, airplanes, and other vehicles. The resins, such as polyester, epoxides, and phenolics, form the matrix which is strengthened by reinforcing means, such as glass or carbon fibers. Mixtures of the resin and reinforcing means are often referred to as "bulk molding composition" or "sheet molding composition" which are formed into the desired part by methods such as compression molding techniques.

One of the desired characteristics of the sheet molding compositions as compared to the ceramic and metal materials having comparable physical characteristics is that the sheet molding compositions are lower in density. This is a substantial advantage in the efficiency of a vehicle made using this material. However, it remains an advantage to produce even lower density SMC. On the other hand, in many applications it is desirable that the SMC has a high gloss surface in order to reduce wind resistance, and to provide an enhanced appearance.

The present method utilizes hollow filler to reduce the density of the composition in which it is incorporated. At the same time, the method results in a high gloss finish through the application of a film to a heated surface. As an aspect of the invention, the heating is applied primarily to a surface portion of the substrate, i.e., the substrate is not heated to a high temperature throughout the thickness. Consequently, the substrate is less likely to release gas. Since gas which is trapped during molding tends to be trapped below a substrate surface, the surface layer, generally has less trapped gas since the gas can more easily escape. In contrast to the present invention, the prior art relates to a high temperature preheating treatment of a sample for a period of time sufficient to allow the substrate to degas throughout. This process is longer and therefore more expensive. More particularly, the film is conductive and the method includes an electrostatic application of a second coating onto the first film. Alternatively, other thermal means could be used to heat a surface such as directed hot air. For large parts, heating by means of infrared heating may be preferable.

U.S. Pat. No. 5,021,297 relates to a process of coating a preformed plastic substrate susceptible to gassing upon heating in which the substrate is preheated at a temperature and for a time sufficient to degas the substrate, which temperature is sufficient to cure a subsequently applied powder coating; and then immediately applying a powder coating to the preheated substrate at a temperature sufficient to cure the powder coating; and then heating the coated substrate so as to cure the powder coated composition.

SUMMARY OF THE INVENTION

In accordance with the present invention, a method is provided for achieving a high gloss finish on a molded composition, and in particular, a compression molded sheet molding composition which includes a hollow filler, the method comprising the steps of:

using absorped radiation or directed thermal convection to heat at least a surface, to a temperature above the melting temperature of a subsequently applied powder coating; and applying a first layer of powder to said heated surface; and elevating if necessary and maintaining the temperature of said heated surface above the curing temperature of said powder by means of the absorped radiation or alternatively, the directed thermal convection and maintaining the temperature for a period of time sufficient to cure said powder to a film. In a preferred embodiment, the powder is a conductive powder and the method includes a subsequent step of electrostatically applying the second coating to at least a portion of said first film. The method applies to substrates molded by methods using vacuum or partial vacuum as well as to methods which do not utilize vacuum.

DETAILED DESCRIPTION OF THE INVENTION

The substrates which can be coated in accordance with the present invention are preformed low density plastic substrates such as compression molded fiberglass reinforced polyester types known in the art as bulk molding compounds (BMC) or sheet molding compounds (SMC). Such compositions are described in publications and patents including the *Modern Plastics Encyclopedia* and *The Encyclopedia of Chemical Technology*, Kirk-Othmer, 2nd Ed., Vol. 20, pp. 791–893, Interscience, 1969. The process may be useful with other compression and injection molding plastics of both the thermosetting and thermoplastic type with and without fiber reinforcement. The fiber reinforcement may include glass fibers or other fibers such as boron fibers.

The process of the present invention may more generally be used on parts which are produced by molding processes such as those achieved using vacuum as well as molding process without vacuum.

suitable substrate compositions include those based on vinyl ester or polyester resins with specific examples including about 100 parts by weight of an unsaturated polyester resin, about 0.05 to 2 parts of an perbenzolquinone inhibitor, about 0.5 to 3 parts of a catalyst such as t-BPB (3° butyl perbenzoate), about 2 to 5 parts of a release agent such as zinc stearate, about 0.5 to 5 parts of a thickening agent such as magnesium oxide, about 0.5 to 2 parts of carbon black, about 25 to about 200, preferably about 50 to about 150 parts, and most preferably about 75 to about 130 parts of reinforcement such as glass fibers and/or glass bubbles and other filler to achieve a desirable specific gravity.

In accordance with the present invention, the substrate is rendered low density through the use of a hollow filler optionally with a traditional filler. An example of such a low density filler is Scothlite brand glass bubbles sold by 3M Industrial Specialties Division of 3M Corporation. These bubbles are hollow unicellular microspheres of soda-lime-borosilicate glass and are described as being low density, free flowing, water insoluble, chemically stable, and having a high strength to weight ratio. Of course, it should be understood that similar equivalent products could be used. The fillers are used in an amount to achieve a substrate specific gravity in the range of from about 1.2 to about 1.6, more preferably from about 1.25 to about 1.5, and most preferably from about 1.3 to about 1.4 at 20° C.

Thus, in accordance with the invention, the bubbles may be used at a range of from about 1 to 40 parts by weight based on 100 parts resin; preferably about 5 to 35 parts, and more specifically from about 10 to about 35 parts. The traditional filler includes calcium carbonate, which can be used at a range from 0 to 200 parts, more preferably from 10 to 150 parts, and most preferably from 20 to 75 parts. The preferred ratio of calcium carbonate to glass spheres and the effect on specific gravity is shown in Table 1.

TABLE

SPECIFIC GRAVITY CHANGE PER CaCO3/BUBBLE RATIO CHANGE

The chart is calculated on parts per hundred by weight based on 100 parts of polyester resin and keeping the glass fiber at 21.2-21.6 percent by volume.

| CaCO3 | B37/2000 | SpGr |
|---|---|---|
| 30 | 25 | 1.28 |
| 40 | 20 | 1.35 |
| 50 | 15 | 1.42 |
| 75 | 10 | 1.54 |
| 100 | 5 | 1.66 |
| 150 | 2 | 1.81 |
| 200 | 0 | 1.91 |

The specific gravity of CaCO3 is 2.75 and the specific gravity of the B37/2000 glass bubbles is 0.37. The volumetric ratio of the fillers has to be maintained, so the amount of CaCO3 added increases as the amount of bubbles decrease.

Powder coating compositions which can be used in the method of the invention can be any of various powder coating compositions known in the art such as thermosetting powder coating compositions. Examples include epoxy resin powder coatings, polyester powder coatings, and acrylic resin powder coatings.

More specific examples of thermosetting epoxy resin powder coating compositions are those based on epoxy group containing acrylic polymers in combination with polyacid curing agents. These powder coating compositions are preferred because they provide superior coating appearance. Examples of polyacid curing agents are saturated aliphatic dicarboxylic acids containing from 4 to 24 carbon atoms. Specific examples of these powder coating compositions are disclosed in U.S. Pat. No. Re. 32,261.

Examples of thermosetting polyester powder coatings are acid group containing polyesters in combination with triglycidyl isocyanurate curing agents. These products are commercially available such as the carboxylic acid group containing polyesters available from Ciba-Geigy as ARALDITE 3010 and 3001, and from Dutch State Mines as URALAC P3600. Triglycidyl isocyanurate curing agent is available from Ciba-Geigy as PT810.

Examples of thermosetting acrylic powder coating compositions are acid group-containing acrylic polymers in combination with an aliphatic dicarboxylic acid containing from 4 carbon atoms per molecule and/or a polymeric polyanhydride and a beta-hydroxyalkylamide crosslinking agent. Specific examples of these powder coatings compositions are described in U.S. Pat. No. 4,727,111.

A particularly preferred thermosetting powder coating composition for smoothness and reduced popping is one based on an epoxy group-containing acrylic polymer and a polyol-modified polyanhydride curing agent such as poly(dodecanedioic) anhydride reacted with trimethylolpropane in an OH/anhydride equivalent ratio of 0.3 to 0.6/1. Such a product contains a mixture of carboxylic acid groups and anhydride groups. Such powder coating compositions are described in U.S. Pat. No. 5,021,297.

Besides the main resinous film-forming ingredients in the powder coating composition described above, the powder coating composition contains other optional ingredients well known in the art of powder coating compositions. Examples of these other ingredients are pigments, flow control agents, absorbing agents, and anti-oxidants.

The powder coating composition of the present invention includes a conductive agent such as carbon black, graphite, metallic additives, or conducting plastics such as those known in the art.

The power coating composition may also include fumed silica or the like as a powder flow additive to reduce caking of the powder during storage. An example of fumed silica is sold by Cabot Corporate under the trademark CAB-O-SIL ®. The powder flow additive when used is generally present in amounts ranging from about 0.1 to about 0.5 percent by weight based on the total weight of the powder coating composition. The powder flow additive is generally added to the particulate powder coating composition after preparation of the particulate mixture.

Pigments which may be used include color pigments normally used in the automotive and industrial applications such as titanium dioxide, iron oxide, chromium oxide, lead chromate, and carbon black, and organic pigments such as phthalocyanine blue and purity phthalocyanine green. Preferably, the radiation is high purity infrared radiation having a wavelength of from about 2.3 microns to about 3.3 microns, preferably about 2.8 microns to about 3.2 microns. A suitable infrared source is clear quartz envelopes, non-oxidizing oils and integral gold reflectors, which typically achieves penetration surface absorption of 4 to 6 mils when at a distance of 15-24 inches. If desired, metallic pigments such as aluminum flake and metal oxide and metal oxide coated micas can also be used in the finishing coat. The finishing coat may additionally contain other materials such as flow control agents, antioxidants, UV light absorbers, and the like.

The powder coating compositions are prepared by melt blending the various ingredients. This can be accomplished by first blending in a high shear or high intensity dry mixer, for example a Welex mixer and then melt blending the mixture in an extruder at a temperature of from about 80° C. to about 130° C. The extrudate is then cooled and pulverized into a powder. The process of the invention is carried out by first forming the plastic substrate in a forming step such as room temperature molding, injection molding, sheet molding, and other extrusion molding techniques.

The substrate is subjected to a power wash (to remove residue which may result from the molding process, such as plasticizers which may be on the surface, or mold lubricants). The part may then be passed through an oven at a temperature of from about 150° to about 300°, and preferably from about 180° to about 250° F. to remove surface water which results from the power wash step. The period of the heating step in the oven is typically from about 10 min. to about 30 min., and more preferably from about 15 min. to about 20 min. Accordingly, the temperature of the substrate is elevated to a temperature which will initiate and achieve a partial degassing. If the temperature of the substrate surface is at or above the melting temperature of the powder coating, then the coating may be immediately applied.

The powder coating will melt and flow out upon contact with the substrate surface giving a uniform smooth liquid surface which bridges over or fills any voids in the substrate surface generated during the partial degassing.

In some circumstances, further elevation of the substrate surface may be achieved using a surface heating technique such as infrared absorption or direct thermal convection to the substrate surface. It is preferable that this temperature is above the melting temperature of the powder coating. Heating of the powder coating is continued at a temperature above the curing temperature of the powder coating in order to initiate cross-linking and curing of the coating. The powder coating subsequently forms a surface skin which seals the coating surface and the substrate as the coating cures.

In the event that the surface of the part is not above the melting temperature of the powder coating, the warm dry part may be subsequently subjected to further superficial heat on part or all of the surface for from about 1 min. to about 5 min., and preferably from about 1.5 min. to about 4 min., and more preferably from about 1 min. to about 3 min. to reach a temperature of from about 250° to about 350°, and preferably from about 260° to about 340°, more preferably from about 270° to about 330° F. and most preferably from about 300° to about 330° F. (150° to 170° C.). This heat can be absorption heat, such as infrared radiation or directed thermal convection, such as forced hot air or gas. It is preferable for large parts to use infrared radiation. In either case, the powder coating composition is immediately applied, before the substrate cools below the melting temperature of the powder coating composition. The powder coating composition can be applied to the plastic substrate by any conventional powder coating technique such as a fluidized bed or spraying. The powder coating composition can be applied in one pass or in several passes to provide a total film thickness of at least 1 mil, preferably from about 3 to about 6 mils, and more preferably from 4 to 5 mils. Preferably the powder includes carbon black pigment which renders it conductive as well as black. Conductivity may be provided by the carbon black or alternative conductive agents may be used.

If necessary, a second application of the infrared is applied to the powder coating to cure the powder coating to form a film, for example for a period of from about 1 min. to about 8 min., preferably from about 1 min. to about 6 min., and more preferably from about 1 min. to about 4 min. Finally, a second coating which may be an electrically conductive powder is electrostatically applied to at least a portion of the first film. The second coating may be a finish coating or may be an intermediate coating prior to a finish coating.

The curing times and temperatures will vary somewhat depending on the powder coating composition. Typically the curing temperatures will be at least 250° F. (121° C.), usually 250° F. (121° C.) to 375° F. (191° C.), and preferably 300° F. (149° C.) to 375° F. (191° C.) for at least 15 minutes, usually from 15 minutes to 1 hour.

The coating process as described can be accomplished in an automatic manner with the substrate to be coated passing on an overhead conveyor to a preheating area with the substrate to be coated passing from a power wash area where the mold release agents such as metal stearates will be removed to a drying area, to any optional infrared heating area, followed by passing to a powder coating station and then passing under a infrared heating apparatus, and then passing to a subsequent electrostatic painting area if so desired.

Optionally, an additional finish coat may be used which typically would include a resinous binder and a pigment. Particularly useful resinous binders include acrylic polymers, polyesters including alkyds and polyurethanes.

A finishing coat may additionally contain other materials such as flow control agents, antioxidants, UV light absorbers, and the like. A finish coat can be applied to the cured powder coating by conventional means such as brushing, spraying, flow coating, and the like, but most often are applied by spraying. The usual spray techniques and equipment for air spraying or electrostatic spraying can be used. Accordingly, the finishing coat is cured as is known to the art.

The finish coat can be applied as a one-coat system or alternatively can be applied as a so-called base coat-clear coat system in which a pigmented or colored basecoat is first applied to the cured system followed by the application of a clear liquid topcoat over the colored basecoat.

The present invention results in a high gloss surface such as an automotive class A surface which is also known in the art as low profile surface. It is noted that this surface is achieved without sanding the finished part and the surface is substantially porosity free.

While in accordance with the Patent Statutes, the best mode and preferred embodiment has been set forth, the scope of the invention is not limited thereto, but rather by the scope of the attached claims.

What is claimed is:

1. A method of achieving a coated finish on a preselected major surface of a compression molded substrate having opposing major surfaces, said substrate comprising a vinyl ester or polyester resin including from about 75 to 130 parts by weight of a hollow filler per 100 parts by weight of said vinyl ester or polyester resin, wherein the method comprises the steps of:
   heating said preselected surface to a temperature of from about 250° F. (121° C.) to about 350° F. (177° C.);
   applying a layer of powder to said preselected heated surface, said powder comprising a thermosetting epoxy or polyester or acrylic powder; and
   maintaining said heated surface at said temperature by the application of a directed heat only to said surface, and subsequently curing said powder to form said coating.

2. A method as set forth in claim 1, wherein said substrate comprises an unsaturated polyester resin containing hollow unicellular glass microspheres and said powder coating comprises the reaction product of an epoxy group containing acrylic polymer and a polyol-modified polyanhydride curing agent.

3. A method as set forth in claim 2, wherein said coating is electrically conductive.

4. A method as set forth in claim 3, further comprising the additional step of electrostatically applying a second coating of electrically conductive powder to at least a portion of said electrically conductive coating.

5. A method as set forth in claim 4, wherein the hollow filler material is in the form of a hollow sphere.

6. A method as set forth in claim 5, wherein the powder is cured by infrared radiation.

7. A method as set forth in claim 5, wherein the powder is cured by directed forced hot air.

8. A method as set forth in claim 7, wherein said filler comprises glass, ceramic or organic microspheres.

9. A method as set forth in claim 8, wherein said substrate has a specific gravity of from about 1.25 to about 1.5 at 20° C.

10. A method as set forth in claim 3, wherein said electrically conductive powder includes carbon black.

11. A method as set forth in claim 10, wherein said substrate has a specific gravity of from about 1.3 to about 1.4 at 20° C.

12. A method as set forth in claim 2, wherein said powder coating further contains carbon black.

13. A method of achieving a coated finish on a preselected major surface of a compression molded substrate having two opposing major surfaces and including a quantity of a hollow filler material such that said substrate has a specific gravity of from about 1.25 to 1.5 at 20° C., comprising the steps of:

heating the preselected surface but not the entire substrate, to a temperature above the melting temperature of a subsequently applied powder capable of forming a coating;

applying a layer of said powder to said heated surface whereby the powder melts and flows and on subsequent curing will provide a smooth surface; and curing said powder by maintaining the temperature above the melting temperature of said powder during curing.

* * * * *